(12) United States Patent
Tzamaloukas

(10) Patent No.: US 9,310,214 B1
(45) Date of Patent: Apr. 12, 2016

(54) SYSTEM AND METHOD FOR DYNAMICALLY REDEFINING ROAD SEGMENT BOUNDARIES

(75) Inventor: Assimakis Tzamaloukas, San Jose, CA (US)

(73) Assignee: BlackBerry Corporation, Wilmington, DE (US)

( * ) Notice: Subject to any disclaimer, the term of this patent is extended or adjusted under 35 U.S.C. 154(b) by 1372 days.

(21) Appl. No.: 12/011,283

(22) Filed: Jan. 24, 2008

(51) Int. Cl.
*G01C 21/00* (2006.01)
*G01C 21/34* (2006.01)

(52) U.S. Cl.
CPC .................................. *G01C 21/3415* (2013.01)

(58) Field of Classification Search
CPC .......... G01C 21/3415; G01C 21/3461; G01C 21/3492; G01C 21/3626; G01C 21/32; G01C 21/34
USPC .......................... 701/200, 208, 210, 400, 533
See application file for complete search history.

(56) References Cited

U.S. PATENT DOCUMENTS

| | | | | |
|---|---|---|---|---|
| 6,038,559 A | * | 3/2000 | Ashby | G01C 21/32 701/410 |
| 6,278,939 B1 | * | 8/2001 | Robare et al. | 701/208 |
| 6,650,948 B1 | * | 11/2003 | Atkinson et al. | 700/66 |
| 7,706,965 B2 | * | 4/2010 | Downs et al. | 701/117 |
| 8,000,889 B2 | * | 8/2011 | Jones | 701/519 |
| 2002/0177947 A1 | * | 11/2002 | Cayford | 701/209 |
| 2007/0106465 A1 | * | 5/2007 | Adam | G01C 21/3492 701/533 |
| 2009/0070035 A1 | * | 3/2009 | Van Buer | 701/210 |

* cited by examiner

*Primary Examiner* — Ryan Zeender
*Assistant Examiner* — Milena Racic
(74) *Attorney, Agent, or Firm* — Fish & Richardson P.C.

(57) ABSTRACT

A system and method adjusts road segment boundaries based on information received from devices that travel a road system for purposes other than road segment definition.

14 Claims, 4 Drawing Sheets

SYSTEM AND METHOD FOR DYNAMICALLY REDEFINING ROAD SEGMENT BOUNDARIES

RELATED APPLICATION

This application is related to U.S. patent application Ser. No. 11/827,747, entitled, "System and method for Identifying Portions of Roads" filed by Rob Currie, Assimakis Tzamaloukas and Brett Lynnes on Jul. 13, 2007, having the same assignee as the present application and is hereby incorporated by reference in its entirety.

FIELD OF THE INVENTION

The present invention is related to computer software and more specifically to computer software for navigation systems.

BACKGROUND OF THE INVENTION

Roads in a metropolitan area may be divided into segments for ease of identification of portions of roads. Such identification may be useful when describing features of portions of roads, such as average estimated speed of each portion. Road information may be broadcast to each device based on the current speeds or travel times of each segment, which allows each device to compute an estimated time of arrival by summing the segment speeds.

However, road segments may not have been assigned in the most efficient manner. For example, the segments may have been assigned based strictly on geography, for example by dividing them into equal length segments of arbitrary length. This may not be an optimal way to assign segment boundaries.

What is needed is a system and method that can redefine segments boundaries.

SUMMARY OF INVENTION

A system and method modifies segment boundaries based on how frequently each segment is traveled, the frequency of deviations of each segment from the average speed or average travel times for that segment, and on the correlation of deviation from the average speed or travel times relative to adjacent or nearby segments.

For example, a large segment that has a speed or travel time that deviates frequently from the average speed or travel time could be divided into two or more portions to allow more efficient reporting, and to help ensure one or both of the remaining segments may not so frequently deviate. The segment may be divided if a combination of the above deviations are present in conjunction with a high travel frequency, or either one of these issues is extreme.

Adjacent segments with travel times or speeds whose travel time or average speed deviations from averages are correlated, and optionally correlated with nearby segments, can be joined to reduce the number of reports of their characteristics, from two or more reports, to a single report for the combined segment. A combination of the above correlation and a low number of times the segment was traveled, or either of these, if either one is extreme, may be used to determine whether to combine a segment with one or more adjacent or nearby segments.

Averages may be determined for each of several different types of days and for time segments within each day to allow comparisons of deviations from averages to be more relevant.

The redefinition of segment boundaries can allow characteristics such as travel time or speed to be reported with greater efficiency and potentially greater accuracy, as segments that deviate together or are infrequently traveled are combined and reported as a single segment, yet provides more information on formerly larger segments that are heavily traveled, deviate from the averages more frequently, or both, by splitting such segments.

DETAILED DESCRIPTION OF A PREFERRED EMBODIMENT

Figure 1:
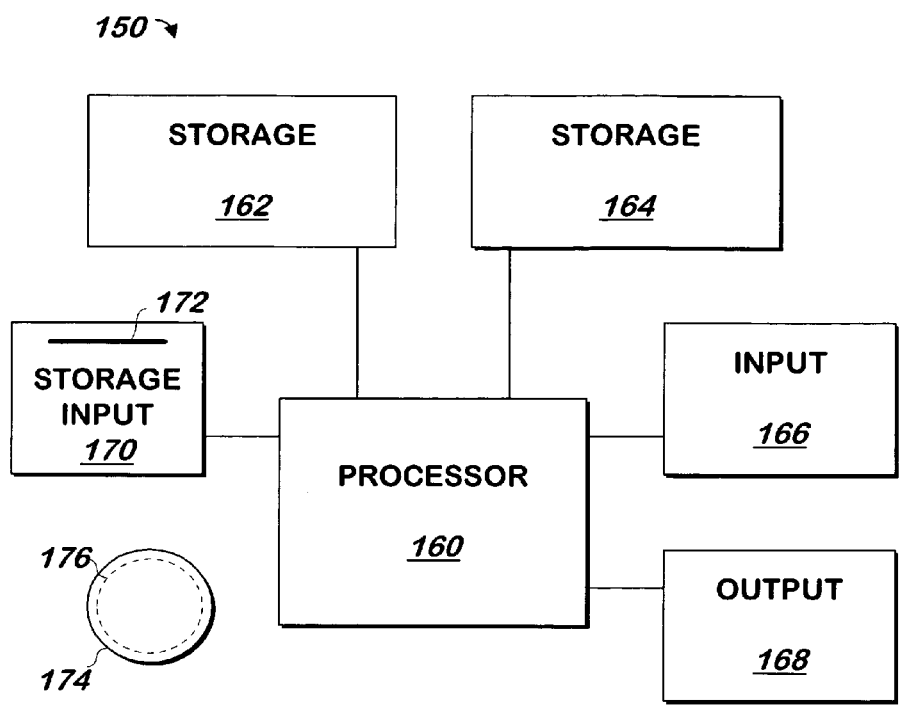
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
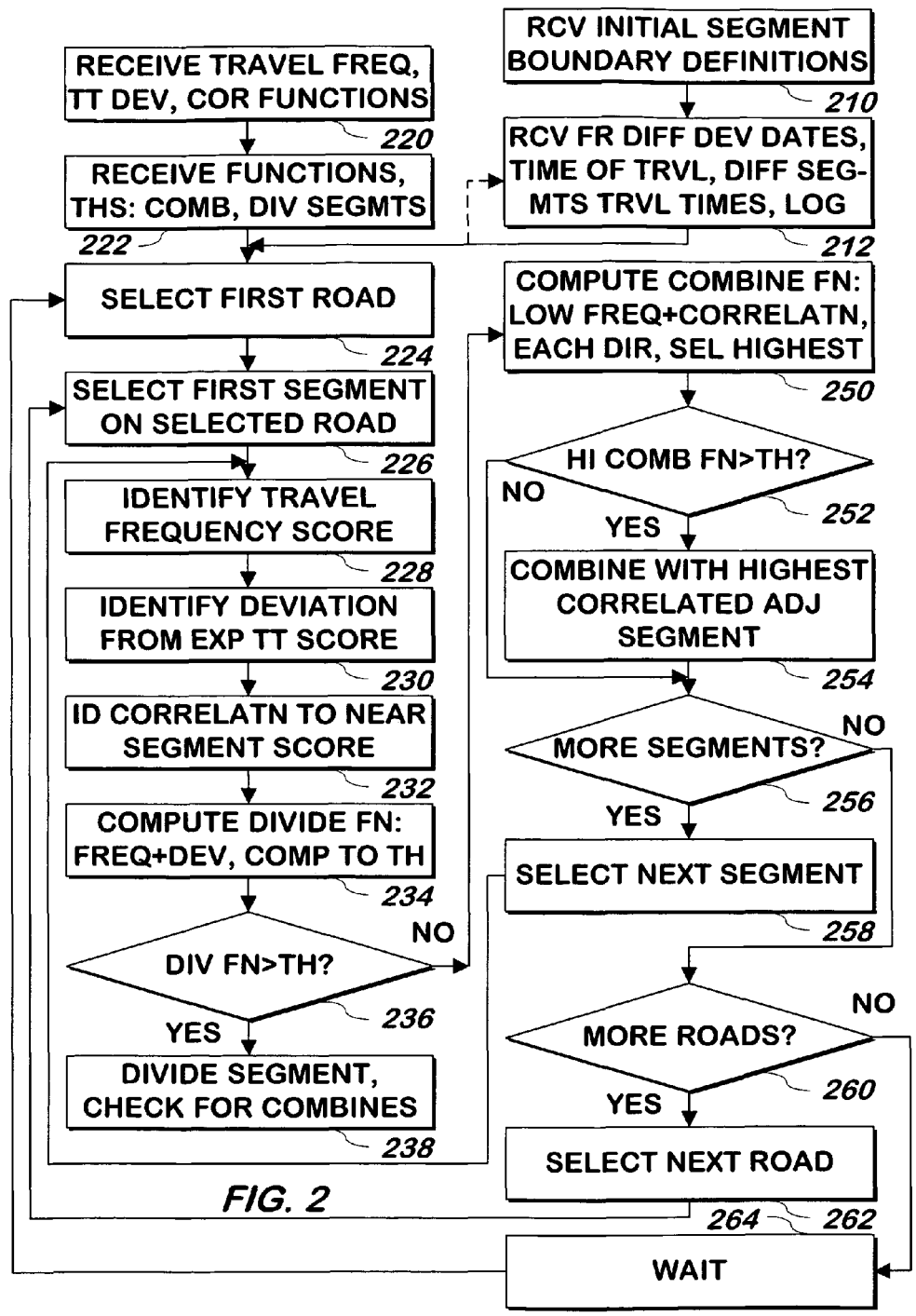
FIG. 2 is a flowchart illustrating a method of redefining one or more road segment boundaries according to one embodiment of the present invention.

Referring now to FIG. 2, a method of changing segment boundaries is shown according to one embodiment of the present invention.

Receipt of Segment Information and Road Map Data.

In one embodiment, each road on a map of roads is divided into segments and the segments are assigned identifiers, and boundaries. The segment boundaries may be initially assigned based on geography. For example, on freeways and major and minor thoroughfares segment boundaries may be assigned by selecting a point of origin for each road, assigning equal length segments on that road from the point of origin in one or both directions, and assigning segment identifiers to each segment. The initial segment boundaries and segment names, and road map data may be received 210. Road map data may include the name of a road and a description of its shape and/or locations along a map. The segment names may incorporate the name of the road to allow the two pieces of information to be associated with one another. In another embodiment, the segment information may include the latitude and longitude of each segment boundary, the name of the road and a description of the shape of the segment, and so map data may be incorporated into the segment information.

Receipt and Logging of Device Data.

In a separate, continuously running process, devices such as GPS enabled navigation devices communicate wirelessly 212 a device identifier, the date and time that device traveled on a segment, its segment identifier, and the time it took to traverse the segment or the average speed through the segment by the device. Such reporting may be done shortly after traversal through each segment, or the reports may consist of batches of such information from several segments. The devices travel these segments for personal reasons of the operators of the vehicles containing the devices, and the travel on the segment is for primary purposes other than road segment definition. Thus, the traversal is made by devices operated by persons who don't work, either as employees or as contractors, for the company that will process the data reported as described herein. Multiple devices such as hundreds or thousands of devices may each perform this same function for multiple segments as they travel through them, and a server receives and logs this information with the date and time of receipt (or the date and time sent, if sent with the other information) as part of step 212. The travel of each of the devices is not ordered or specified for the purpose of road segment definition, and thus, travel is not made by a single device, or by devices that only traverse a long length of one road only to turn back on the same road or a different road and traverse another long length, or by devices performing travel directed solely to collect such data. Every segment from among the possible road segments may or may not be traveled by the devices and different segments may be traversed varying numbers of times during any period in which such information is analyzed.

In one embodiment, step 212 includes retrieving the date and time of receipt, for example, from a system clock, or obtaining the date and time of data collection provided by the device, comparing the date with a calendar, and identifying the type of day and the time segment corresponding to the date and time of each piece of information and adding it to the log with the corresponding information received from the device. Types of days may include non-holiday weekdays, non-holiday weekends, holiday weekdays and holiday weekends. Other types of days may be used, for example summer versions of the above types of days may be used for communities near beaches or other recreational facilities. Time segments may be 30 minute segments, two per hour, although segments with varying lengths may also be used, for example, 15 minute segments between the hours of 9-5 on weekdays, with 30 minute segments at other times.

The data thus collected will be from many different devices making various distance trips at various times and types of days.

In one embodiment, step 212 includes identifying the type of road corresponding to the segment identifier. Types of roads may include freeways, major arteries, minor arteries and surface streets. The type of each road may be identified via lookup of the segment identifier, street name or both on the road map data, and stored with the corresponding information in the log.

Receipt of Functions and Thresholds.

A travel frequency function is received 220. The travel frequency function describes how to calculate the travel frequency for a segment. In one embodiment, the travel frequency function receives as an input, any or all of the number of times a road segment has been traversed, the type of road to which the segment corresponds, the type of day, the time segment corresponding to the travel in the segment for each of all of the travel during a period of analysis recorded in step 212. The travel frequency function measures how frequently the road segment was traveled or traveled during the period of analysis, with a higher travel frequency function result indicating the road was traveled more frequently than a lower travel frequency function result. It is noted that a strict definition of frequency need not be used with respect to the travel frequency function, as an amount of travel may be used, with more recent travels through a segment being weighted more heavily than older travels through the segment in order to determine travel frequency of a segment. In one embodiment, travel on certain types of days and certain times may be weighted by the travel frequency function more heavily than travel on other types of days. Travel in the most recent days may be weighted by the travel frequency function more heavily than travel in days further past by the travel frequency function. In one embodiment, travel on one road type may be weighted by the travel frequency function more heavily than travel on another road type. The weighted number of times the segment has been traveled will be summed to provide the function result for each report of travel over the period of analysis.

In one embodiment, the travel frequency function may be specified so that roads that are have high historical frequencies of travel receive a higher travel frequency function score than they would otherwise, as do those for which travel is recorded in a high percentage of time segments, or a high percentage of some time segments, such as time segments that correspond to rush hour times for the metropolitan area under consideration.

In one embodiment, variations of travel frequency in any one segment or any set of segments from one day to the next within the same type of day and same time set may be smoothed by the travel frequency function using any conventional smoothing algorithm, such as an exponential smoothing function. In other embodiments, the travel frequency function may instead be defined to amplify such variations. Each of these things are specified by using the travel frequency function. Each function specified as described herein may be specified using any conventional function specification technique.

A travel time deviation function is received as part of step 220, using any conventional function specification technique. The travel time deviation function receives as inputs various travel times recorded in step 212 for the same segment identifier during a period of analysis, and the corresponding date, type of day, and time segment, as well as expected travel times for each type of day and time set. The travel time deviation function has a higher result when travel times through a segment frequently vary from their expected times, and lower when travel times through the segment rarely vary from their expected times. The expected travel times may be averages of those for the same type of day and time segment, which may be weighted more heavily towards recent travel times. It is noted that average speeds may be used in place of travel times.

The travel time deviation function may assign a higher weight to variations at certain times and types of days than variations at other times, for example, weighting variations during time segments on nonholiday weekdays between 9 am and 5 pm more heavily than those on other times and types of days. Weights may also vary according to the type of road weighing variations on freeways more, or less heavily than those on surface streets.

A correlation to nearby segments function is received as part of step 220. This function receives as inputs travel times for a segment, as well as travel times for the adjacent segments and optionally nearby segments, during a period of analysis along with the date, type of day and time set and type of road of each of the travel times received. The correlation to nearby segments function result is higher if the travel times of an adjacent segment, and optionally nearby segments, correlate, after adjustment for the size of each segment or the travel speeds of such segments correlate. Correlation may be identified independently for different types of days and certain times within the types of days, a score assigned to each, and then the scores may be weighted and the weighted scores summed to identify the function result, as defined in the function. The correlation is identified for a single direction from the segment to which the function is being applied and one input indicates the direction that should be used. If segments other than the adjacent segment are used by the function, the correlations between the segment being correlated and each of the adjacent and other segments may be identified independently for the adjacent segment and one or more of the other nearby segments in the same direction as the adjacent segment, with the correlations of travel times weighted more heavily the closer the nearby segment is to the adjacent segment, and the adjacent segment weighted even more heavily, with the weighted correlations summed to produce the correlation function result as specified by the correlation to nearby segments function. Different types of roads may be weighted differently by the correlation to nearby segments function.

A function and threshold for combining segments is received 222. The combine function describes the calculations for producing a combine function result. If the combine function result for a segment exceeds the combine function threshold, the segment will be combined, for example, with a neighbor segment as described below. In one embodiment, the inputs to the combine function for a road segment are the outputs of the correlation to nearby segments function result for that road segment and the travel frequency function result for that road segment, and each may be weighted based on the combine function result specification.

A function and threshold for dividing segments is received, also as part of step 222. This segment divide function describes the calculations for producing a divide function result. If the segment divide function result for a segment exceeds the segment divide function threshold, the segment will be divided, for example, into two segments as described below. The segment divide function may incorporate as inputs for a segment the output of the travel frequency function for that segment and the output of the travel time deviation function for that segment so that the higher each of these function results are, the higher the segment divide function result is. Each may be weighted according to the divide function specification.

Thresholds may be adjusted so that the total number of segments results within a desirable range. For example, if it is determined that about 100,000 segments would be desirable, the thresholds may be adjusted so that on most days, the number of segments that result as described herein is between 90,000 and 110,000. If 1000 segments would be desirable, the thresholds may be adjusted so that on most days, the number of segments that result as described herein is between 9,000 and 1100.

Thresholds may be adjusted so that, at least on most days (e.g. 80%), at least the top N most traveled segments are traveled a certain number of times for each of a certain number of time periods, for example, at least once in every rush hour of every weekday.

Thresholds may be adjusted by trial and error until any or all of the above rules are met, or historical data may be used, and the thresholds adjusted by trial and error or by mathematical computation until the rules above are met. Then those thresholds discovered using historical data are used on current data as described below. Thereafter, the thresholds may be held until the rules above are not met, at which time the thresholds may again be adjusted so as to cause any or all of the rules described above to be met.

In one embodiment, some or all of the functions and thresholds described herein are provided, and are not separately received from a system administrator. In other embodiments, these items are received from a system administrator. Such receipt allows the system administrator to tune the system. As such functions and thresholds are received, they may be used at the next analysis, so that if a function or threshold is replaced, it will be used after all segments have been analyzed using the same functions and thresholds.

Analysis of Road Segments.

Once the functions and thresholds are received, an optional analysis period may be defined as part of step 226. Road segment information received in step 212 with a date and time within the analysis period will be provided to the functions to analyze the road information and redefine the segment boundaries as described herein. A start signal may be received as part of step 226.

Using the segment definitions and/or road map data, a first road is selected 224 from the multiple roads described in the road map data. A first segment of the road is selected 226. In one embodiment, selection of segments is performed from one end of the selected road to the other, starting at either end.

A travel frequency score is identified 228 for the selected segment using the travel frequency function received in step 220. Each function described herein is applied to the segment information for the selected segment received in step 212 that was either collected or received during the period of analysis received in step 226.

A deviation from the expected travel time score is identified 230 for the selected segment using the travel time function received in step 220 and road segment information for the selected segment collected or received during the analysis period. As noted, expected travel times may be computed using a weighted average travel time for each type of day and time segment, with more recent data being weighted more heavily than older data.

One or more correlation to nearby segment scores are identified 232 for the selected segment using the travel time correlation function received in step 220. In one embodiment, the correlation is only performed for the same road in the opposite direction of segment selection, and in another embodiment, the correlation is performed for the same road in both directions (except for the ends of the road, in which case only the available direction is used) to allow the selection of the best correlation to be selected if the threshold correlation is identified in both directions.

The segment divide function is computed for the selected segment using the function results described above, and the segment divide function result is compared to the segment divide function threshold 234. If the result of the segment divide function does not exceed the threshold 236, the method continues at step 250. If the result of the segment divide function exceeds the threshold 236, the boundaries of the selected segment are divided 238 and the two new segments are checked to determine whether they should be combined with the adjacent segments as will be described in more detail below with respect to FIG. 3. Following the process described with respect to FIG. 3, the method continues at step 256.

In one embodiment, dividing a segment involves adding a new segment boundary between the newly divided segments, while keeping the boundaries of the selected segment as the outer boundaries of the newly divided segments, retaining the segment identifier for the segment in the opposite direction of segment selection, and assigning a new segment identifier to the other newly divided segment. In one embodiment, the new segment boundary bisects the selected segment, but in another embodiment, the new segment boundary is set to one side or the other, for example, allowing one of the newly divided segments to be twice the size of the other one. The one selected for being twice the size of the other one is the one in the direction of the higher correlation function score in one embodiment, and the other one in another embodiment. In one embodiment in which different sized divisions may be made, if neither correlation function score exceeds the other by a threshold amount, the division is made by bisection of the selected segment. Step 238 includes identifying how the segment division is to occur.

Figure 3:
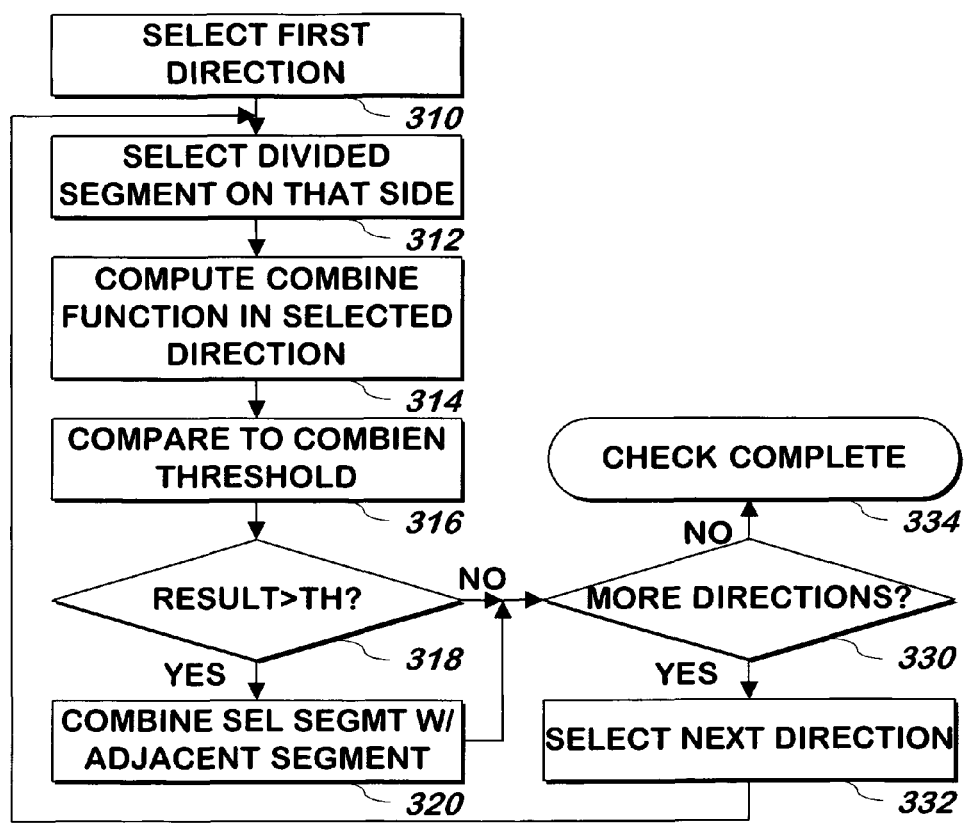
FIG. 3 is a flowchart illustrating a method of combining one or more divided road segments with adjacent road segments according to one embodiment of the present invention.

Referring now to FIG. 3, a method of determining whether divided segments should be combined with an adjacent segment is shown according to one embodiment of the present invention. The method of FIG. 3 is performed initially to determine whether a newly divided segment should be combined with a segment other than the other newly divided segment. A direction is selected 310 from the two directions on the road selected as described above. The newly divided segment is selected 312 that is in the selected direction relative to the common boundary of the newly divided segments. The segment combine function is computed 314 for the selected segment in the selected direction. In one embodiment, the segment combine function is not computed in the other direction, as that would serve to recombine the segments just divided. The result of the segment combine function is compared to the segment combine threshold 316. If the result of the segment combine function exceeds the segment combine threshold 318, the selected segment is combined 320 with the adjacent segment, by redefining the boundaries of the adjacent segment to encompass the selected segment as well and eliminating the selected segment as a separate segment, or vice versa, and the method continues at step 330. If the result of the segment combine function does not exceed the combine threshold 318, the method continues at step 330.

To combine two segments, the segment boundary between them is eliminated, and the segment identifier in the opposite direction of segment selection is assigned to the resulting combined segment. The other segment identifier is not assigned to a segment, and may be held in reserve to allow reassignment of the segment identifiers in sequential order so that a combined segment near a divided segment will not require any new segment identifiers to be assigned, with the segment identifiers between such segments being reassigned in order of the segments. Other embodiments use other methods of segment identifier assignment so that such reassignment is unnecessary. One identifier assignment technique is described in the related application.

In one embodiment, combination of road segments is constrained by the segment combine function not to occur or not to occur in this type of combine (one immediately following a divide) if the segments are on the opposite side of an intersection with a major artery, minor artery or freeway. In one embodiment, such constraints are only in place if the intersecting road is of the same or higher level than the selected road, with levels, from lowest to highest, being 1) minor arteries, 2) major arteries (including highways), and 3) freeways.

At step 330, if there are more directions not already selected, the next direction is selected 332 and the method continues at step 312 using the newly selected direction. Otherwise 330, the check for combining newly divided segments is complete 334. As noted, the method continues at step 254 of FIG. 2.

Referring again to FIG. 2, at step 250, the segment combine function is computed for each direction from the selected segment using the function results described above, and the highest of the two results is retained and compared with the combine threshold. If the highest result is greater than the threshold 252, the selected segment is combined with the adjacent segment in the direction of the threshold 254 in the manner described above.

In one embodiment, instead of computing the combine function in both directions, the combine function is only computed in the direction opposite that used to select segments if the prior segment was divided or combined, and otherwise, the combine function is only computed in the same direction as is used for segment selection.

It is noted that when segments are divided as described herein, the information for the old segment such as travel times or average speed and number of times the segment has been traveled, is duplicated into the new segment so that both segments will have the same information. Expected travel times are divided in half or using the relative lengths for each of the divided segments.

When segments are combined as described herein, the information for the segments are combined to identify the travel time for the entire segment by adding the travel time from two nearby-in-time visits by the same device, or taking their weighted average travel speeds relative to the length of each of the combined segments, and combining the number of times devices traveled into the combined segment by adding counts from each after eliminating duplicate counts for those that are nearby one another in time, representing a single trip through the two segments that became combined segment. The device identifiers for the device that sent the information may be received as part of step 212 and stored with the data to allow such combinations to occur. Expected travel times are adjusted for the combined segments by adding the expected travel times together.

If there are more segments for the selected road 256, the next segment on the selected road is selected 258 and the method continues at step 228 using the newly selected segment. If there are no more segments for the selected road 256, if there are more roads 260, the next road is selected 262 and the method continues at step 226 using the newly selected road. If there are no more roads 260, the method may allow a delay to occur 264 before starting again at step 224.

Figure 4:
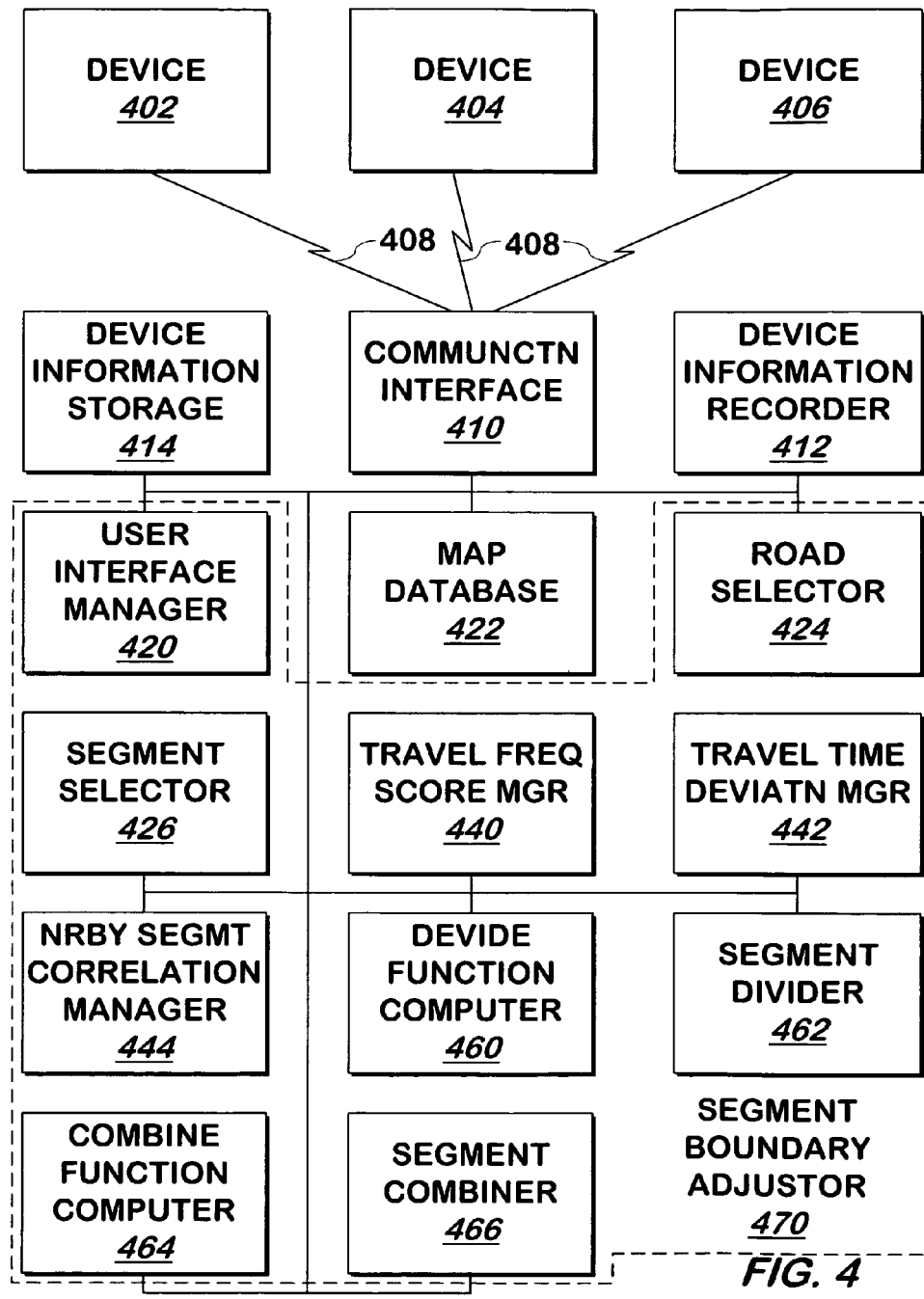
FIG. 4 is a block schematic diagram of a system for redefining road segment boundaries according to one embodiment of the present invention.

Referring now to FIG. 4, a system for adjusting road segment boundaries is shown according to one embodiment of the present invention. Devices 402-406 include conventional GPS-position-receiving, location-aware, wireless-network communicating devices, such as navigation devices that provide driving directions and travel time estimates. Devices 402-406 provide segment identifiers and travel times they experience while traveling through each of different segments, optionally, along with the date and time of travel as described above, to communication interface 410, which includes a conventional TCP/IP-compatible communication interface. Communication interface 410 may run communication protocols, such as Ethernet, and other conventional communication protocols. Communication interface 410 provides such travel time information to device information recorder 412, which stores such information in device information storage 414 as described above. In one embodiment, the information includes a segment identifier, (which may be unique among segments in a metropolitan area, and thus defines a road and a range of locations on the road), a direction, the travel time (or an average speed) from one end of the segment to the other, an identifier of the device, and the date and time the segment was traveled, such as the time it was entered, exited, or an average of these times. Such information is received and stored at various times around the clock.

A system administrator or other party uses user interface manager 422 provide specifications for a travel frequency function, a travel time deviation function, and a correlation to nearby segments function as described above. In one embodiment, all communication with user interface manager 422 is made via communication interface 410. User interface manager 420 stores the specification for the travel frequency function in travel frequency score manager 440, stores the specification for the travel time deviation function in travel time deviation manager 442, and the specification for the correlation to nearby segments function in nearby segment correlation manager 444.

The system administrator or other party provides specifications for a segment divide function and a segment combine function, as well as a segment divide function threshold and a segment combine function threshold, each as described above, to user interface manager 420. User interface manager 420 stores the specification for the segment divide function in divide function computer 460 and stores the specification for the segment combine function in combine function computer 464.

Map database 422 includes a conventional map database containing road map data, described above, that describes the location of various points on roads, and segment information that defines the current segment boundaries as described above. In one embodiment, an original copy of the map database may be retained, so that as changes are made to map database 422, they may be compared with the original version of the map database.

A system administrator indicates to user interface manager 420 to begin operation of the system of FIG. 4. When it receives the indication, user interface manager 420 retains a copy of the map database from map database 422 and signals road selector 424.

When so signaled by user interface manager 420, road selector 424 selects a first road in map database 422 as described above and provides the identifier of the selected road to segment selector 426.

When it receives the identifier of the selected road, segment selector 426 selects a first segment on one end of that road as described above, and provides the identifier of the segment and road to travel frequency score manager 440, travel time deviation manager 442 and nearby segment correlation manager 444.

When it receives the identifier of the road and segment, travel frequency score manager 440 computes a travel frequency score for the road and segment whose identifiers were received, by using the information in map database 422 and the travel frequency function it received as described above. Travel frequency score manager 440 provides the travel frequency score to segment selector 426.

When it receives the identifier of the selected road and the identifier of the selected segment, travel time deviation manager 442 uses the information in map database 422 as described above and the travel time deviation function it received to compute a travel time deviation score for the segment whose identifier it received as described above. Travel time deviation manager 442 provides the travel time deviation score to segment selector 426.

When it receives the identifier of the selected road and the identifier of the selected segments, nearby segment correlation manager 444 computes one or more nearby segment correlation scores for the segment whose identifier it received using the correlation to nearby segments function it received and the information in map database 422 as described above and provides the score to segment selector 426.

Segment selector 424 provides the travel frequency score and travel time deviation score it receives, and the identifier of the segment and identifier of the road, to divide function computer 460.

When it receives the travel frequency score and the deviation from the expected travel time scores, divide function computer 460 computes the divide function for the segment using the received scores and the segment divide function as described above and compares it to the segment divide threshold, each of which having been received as described above. If the divide function result exceeds the threshold, divide function computer 460 provides the identifiers of the road and the segment received as described above to segment divider 462, which divides the segment in map database 422 as described above. In one embodiment, segment divider 462 also checks to determine whether or not any of the newly divided segment should be combined with an nearby segment as described above with reference to FIG. 3. If such a segment should be combined, segment divider 462 combines the segment in map database 422. When it has completed these activities, segment divider 462 signals divide function computer 460. When it receives such signal, or it determines the segment divide threshold has not been exceeded, divide function computer 460 signals segment selector 426.

Segment selector 424 provides the one or more nearby segment correlation score and travel frequency score it receives, and the identifier of the segment and identifier of the road, to combine function computer 464.

When it receives the travel frequency score and one or more nearby segment correlation scores and the identifier of the road and segment, combine function computer 464 identifies the combine function for the segment and compares it to the threshold received as described above. If the result of the combine function exceeds the threshold in either direction from the segment whose identifier it received, combine function computer 464 provides the identifier of the road and the segment and the direction corresponding to the highest correlation exceeding the threshold to segment combiner 466. When it receives the identifier of the road and segment and the direction, segment combiner 466 combines in map database 422 the segment and its nearby segment in the direction so indicated as described above, and signals combine function computer 464. When it receives the signal or it determines that the combine function threshold has not been exceeded in either direction, combine function computer 464 signals segment selector 426.

When it receives the signals from divide function computer 460 and combine function computer 464, segment selector 426 determines if there are additional segments on the road whose identifier it received as described above. If so, segment selector 426 selects the next segment on the road whose identifier it received and repeats the procedure described above using that segment. If there are no additional segments, segment selector 426 signals road selector 424.

When so signaled, road selector 424 determines if there are additional roads it did not already select, and if so, selects the next road and provides an identifier of the selected road to segment selector 426, which repeats the procedure described above. If there are no additional roads, road selector 424 signals user interface manager 420.

When signaled, user interface manager 420 counts the segments in map database 422 and provides for display the number of segments to the system administrator. If the system administrator is satisfied with the number of segments, information describing the difference between the former map database and the newly updated map database is identified and provided to devices 402-406 by user interface manager 420 via communication interface 410. Devices 402-406 update their own map databases, and will use such information to report travel times or average speed as described above. In one embodiment, user interface manager 420 issues a new version number to the map database and stores the version number and the date and time in map database 422. This allows the different device information to be correlated to the map database information in effect at the time. The version number is sent with the information describing the differences between the databases, and the devices provide the version number of the databases they are using when the travel time or average speed is provided. Old versions, the differences, and the version identifiers are stored in a special section of map database 422 to allow the old device information to be used and converted to other versions.

The combination of elements 420 and 424-466 are referred to as a segment boundary adjustor, because it changes the prior segment boundaries. As described herein, the segment boundaries are changed using a copy of the segment boundaries, but other embodiments may use the original of the segment boundaries, building the copy of the segment boundaries one segment boundary at a time, for example.

What is claimed is:

1. A method, implemented on one or more processors, for defining road segment boundaries comprising:
   receiving, by the one or more processors, a plurality of road segments with each road segment including an associated set of boundaries;
   receiving and logging, by the one or more processors, from a plurality of devices traversing road segments, information comprising a segment identifier and information related to speed of traversal by the devices;
   selecting, by the one or more processor, at least one road segment based on a frequency of the at least one road segment being traversed; and
   adjusting, by the one or more processors, the set of boundaries of the at least one selected road segment based on the information related to speed of traversal by the devices,
   wherein the adjusting of the set of boundaries comprises combining at least two adjacent road segments based on (1) deviation of travel times or average speeds of each of the two adjacent road segments from an average of the travel times or the average speeds of the two adjacent road segments, and (2) the frequency of at least one of the at least two adjacent road segments being traversed, said combining the at least two adjacent road segments including maintaining segment identifiers associated with the at least two adjacent road segments.

2. The method of claim 1, wherein the adjusting the set of boundaries of the at least one selected road segment comprises: dividing a selected road segment into two road segments by adding a third boundary between two boundaries of the selected road segment.

3. The method of claim 2, wherein the dividing the selected road segment boundaries is responsive to a frequency or amount of travel in at least one of the two road segments.

4. The method of claim 1 wherein the adjusting the set of boundaries comprises for at least one set of at least two adjacent road segments, combining at least two adjacent road segments by removing a road segment boundary between them.

5. The method of claim 1, wherein the deviation of travel times or average speeds are determined responsive to travel times or average speeds that are grouped according to types of days or times.

6. The method of claim 2, wherein the selecting of at least one road segment is further based on a frequency of a road segment being traversed and includes weighting the road segments with road segments being more recently traversed being weighted more.

7. The method of claim 1, wherein the plurality of devices traversing the road segments is for purposes other than road segment boundary definition.

8. A non-transitory computer readable medium having computer readable program code embodied therein for defining road segment boundaries, the non-transitory computer readable medium comprising computer readable program code configured to cause a computer system to:
   receive a plurality of road segments with each road segment including an associated set of boundaries;
   receive and log, from a plurality of devices traversing road segments, information comprising a segment identifier and information related to speed of traversal by the devices;
   select at least one road segment based on a frequency of the at least one road segment being traversed; and
   adjust the set of boundaries of the at least one selected road segment based on the information related to speed of traversal by the devices,
   wherein the adjusting of the set of boundaries comprises combining at least two adjacent road segments based on (1) deviation of travel times or average speeds of each of the two adjacent road segments from an average travel time or average speed of the two adjacent road segments, and (2) the frequency of at least one of the at least two adjacent road segments being traversed, said combining the at least two adjacent road segments including maintaining segment identifiers associated with the at least two adjacent road segments.

9. The non-transitory computer readable medium of claim 8, wherein the adjusting the set of boundaries of the at least one selected road segment comprises: dividing a selected road segment into two road segments by adding a third boundary between two boundaries of the selected road segment.

10. The non-transitory computer readable medium of claim 9, wherein the dividing the selected road segment boundaries is responsive to a frequency or amount of travel in at least one of the two road segments.

11. The non-transitory computer readable medium of claim 8, wherein the adjusting the set of boundaries comprises for at least one set of at least two adjacent road segments, combining at least two adjacent road segments by removing a road segment boundary between them.

12. The non-transitory computer readable medium of claim 8, wherein the deviation of travel times or average speeds are determined responsive to travel times or average speeds that are grouped according to types of days or times.

13. The non-transitory computer readable medium of claim 8, wherein the selecting of at least one road segment is further based on a frequency of a road segment being traversed and includes weighting the road segments with road segments being more recently traversed being weighted more.

14. The non-transitory computer readable medium of claim 8, wherein the plurality of devices traversing the road segments is for purposes other than road segment boundary definition.

\* \* \* \* \*